Figure 1:
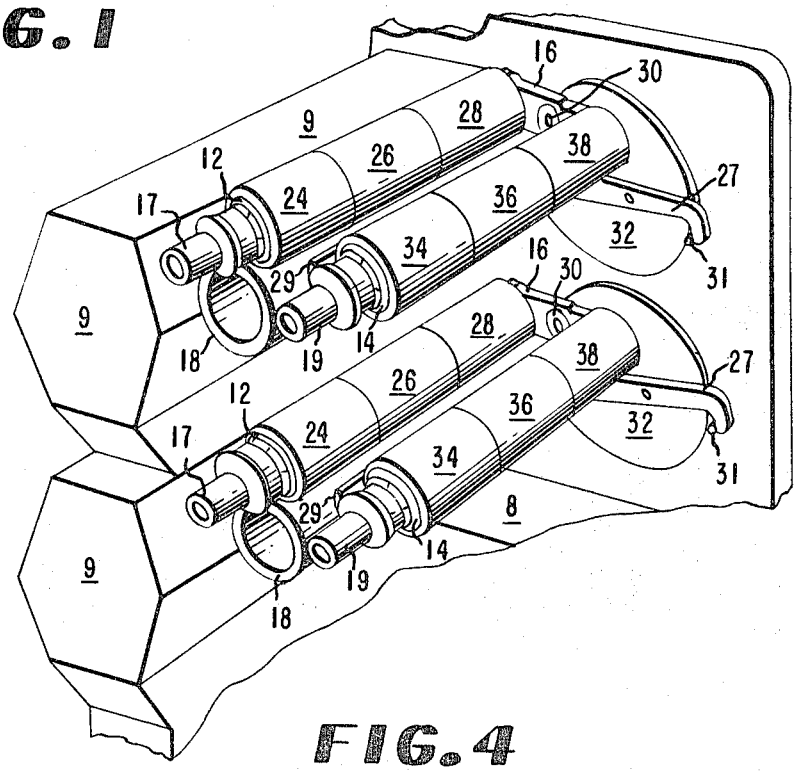
Figure 4:
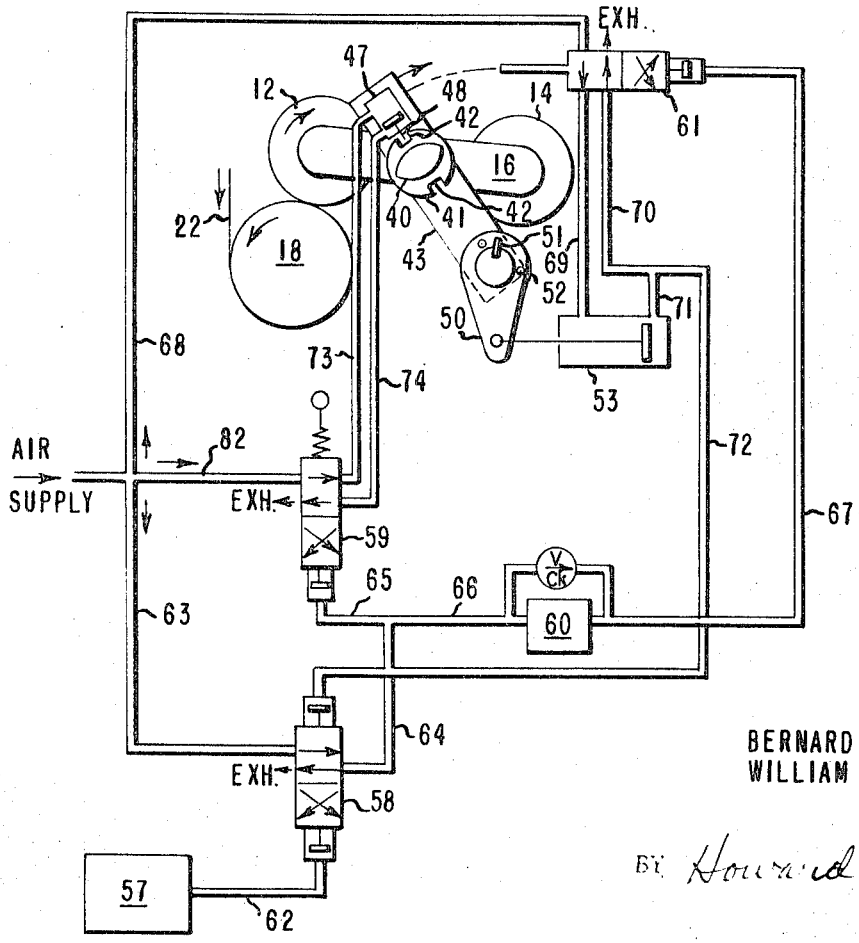
Figure 2:
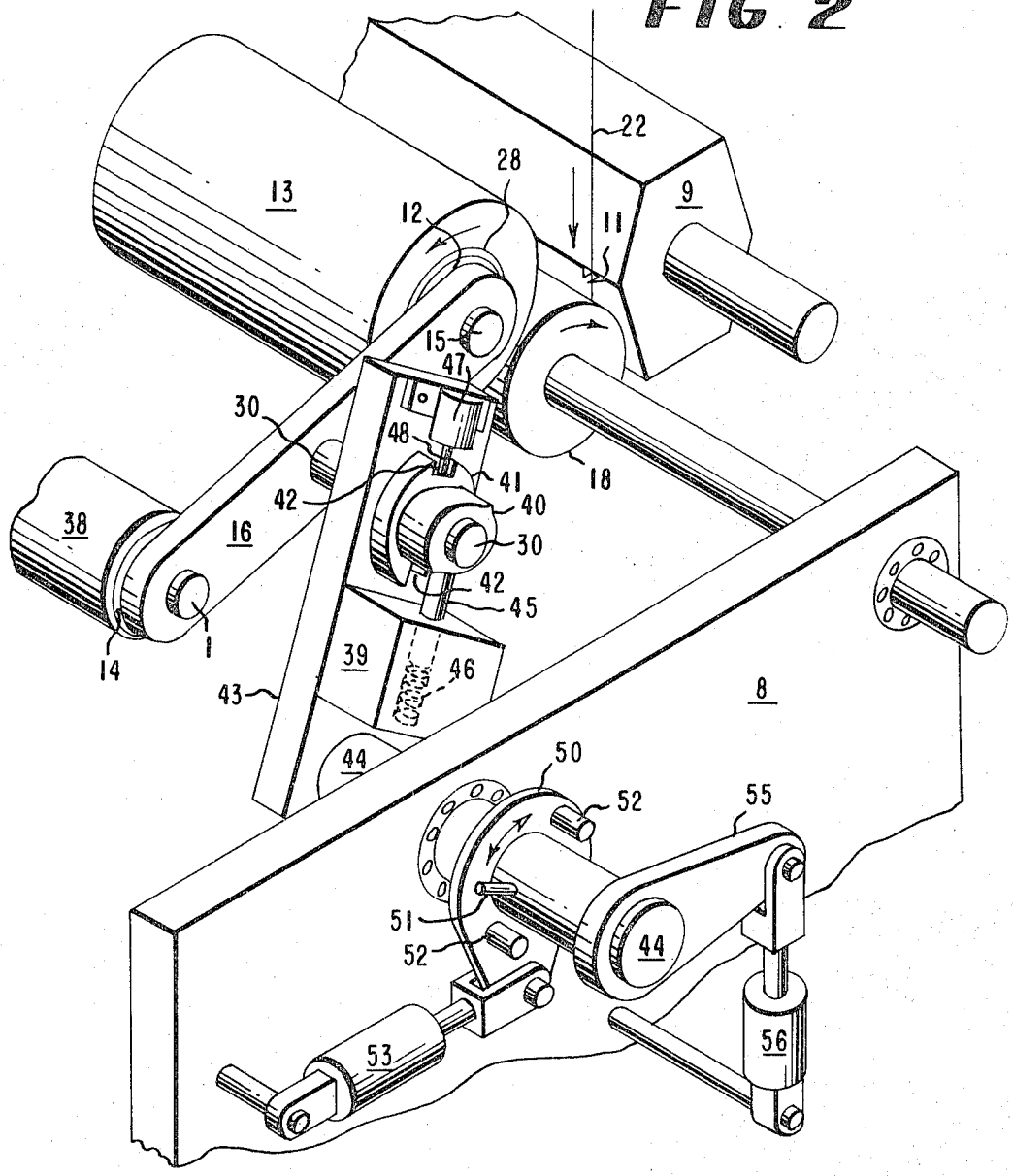
Figure 5:
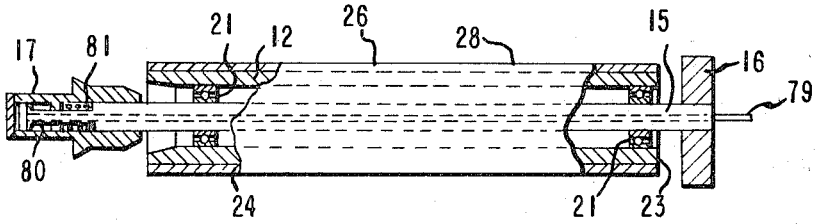
Figure 3A:
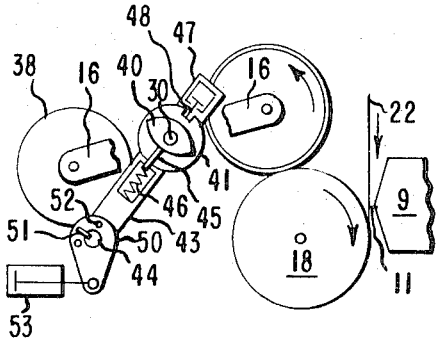
Figure 3B:
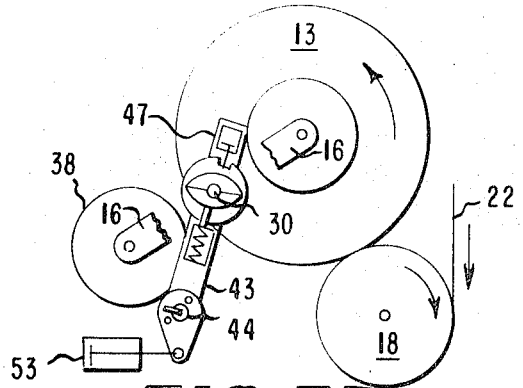
Figure 3C:
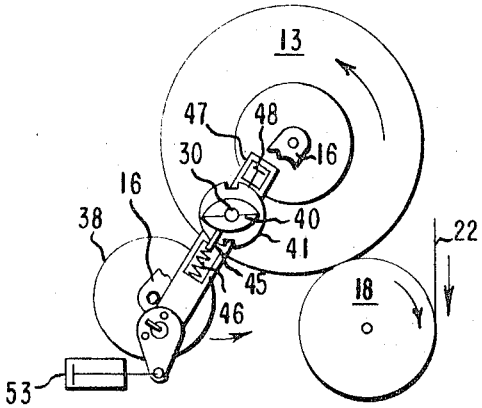
Figure 3D:
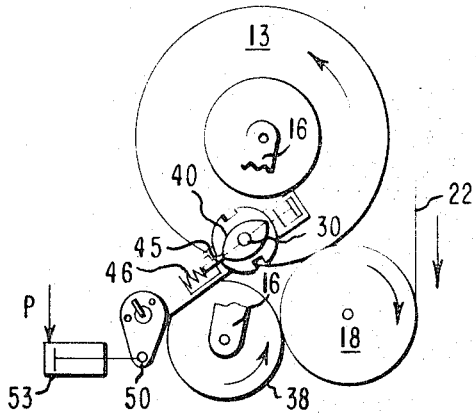
Figure 3E:
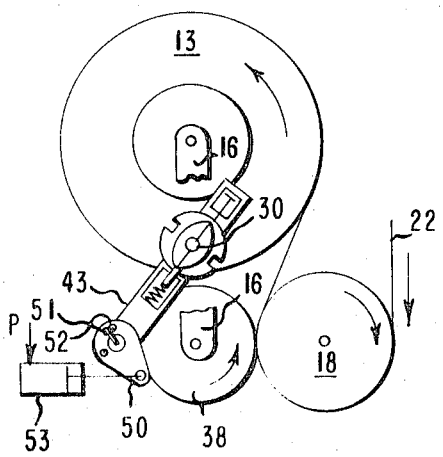
Figure 3F:
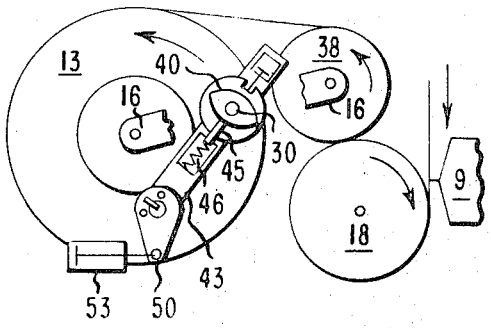
Figure 6:
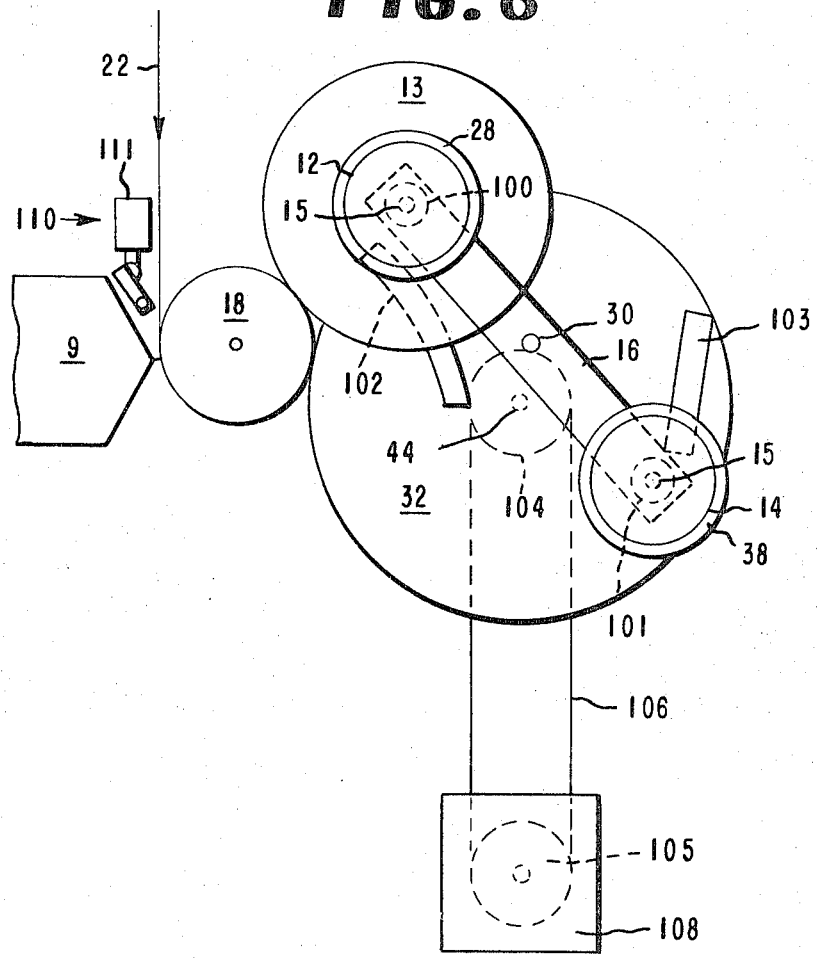

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 7

T901,005

APPARATUS FOR WINDING YARN

Bernard Franklin Shelley, 207½ Matthes Ave. 19804, and William David Walker, 2328 Kennwynn Road 19803, both of Wilmington, Del.

Filed Mar. 31, 1971, Ser. No. 129,820

Int. Cl. B65h *54/02*

U.S. Cl. 242—18 A

4 Sheets Drawing. 10 Pages Specification

A yarn winding apparatus of the type that provides for automatically transferring winding action from a full to an empty yarn package support without waste is modified by the addition of a device to provide storage and release of mechanical torque to assist in rotating a pivotally mounted arm carrying the package supports. The winding apparatus includes a frame, a pair of package supports alternately movable into surface driven engagement with a drive roll and an arm pivotally mounted between its ends to a linkage mechanism connected to

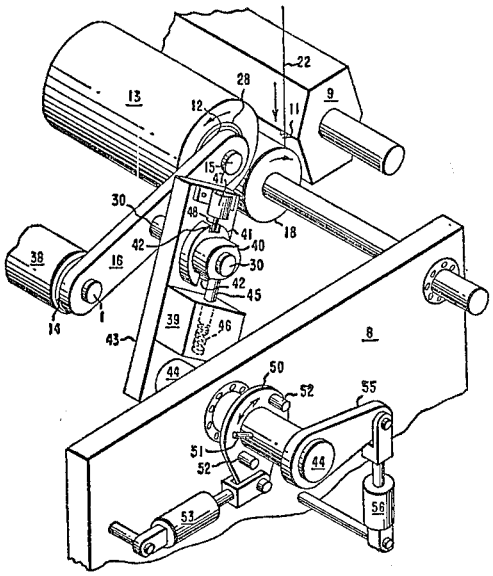

the frame. The supports are carried by chucks rotatably mounted at opposite ends of the arm. A cam keyed to the arm at its pivot point engages a spring-backed cam follower mounted to the linkage mechanism for storing and transmitting mechanical torque to assist in pivoting the arm.

APPARATUS FOR WINDING YARN

Filed March 31, 1971 4 Sheets-Sheet 1

INVENTORS
BERNARD FRANKLIN SHELLEY
WILLIAM DAVID WALKER

BY Howard R. West Jr
ATTORNEY

APPARATUS FOR WINDING YARN

Filed March 31, 1971 4 Sheets-Sheet 2

INVENTORS
BERNARD FRANKLIN SHELLEY
WILLIAM DAVID WALKER

BY Howard P. West Jr
ATTORNEY

APPARATUS FOR WINDING YARN

Filed March 31, 1971 4 Sheets-Sheet 3

INVENTORS
BERNARD FRANKLIN SHELLEY
WILLIAM DAVID WALKER

BY Howard P. West Jr.
ATTORNEY

APPARATUS FOR WINDING YARN

Filed March 31, 1971 4 Sheets-Sheet 4

INVENTORS
BERNARD FRANKLIN SHELLEY
WILLIAM DAVID WALKER

BY Howard P. West Jr.
ATTORNEY